United States Patent
Kuwabara

(10) Patent No.: US 9,738,305 B2
(45) Date of Patent: Aug. 22, 2017

(54) TILT STEERING APPARATUS

(71) Applicant: HONDA MOTOR CO., LTD., Minato-ku, Tokyo (JP)

(72) Inventor: Naoki Kuwabara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 217 days.

(21) Appl. No.: 14/996,364

(22) Filed: Jan. 15, 2016

(65) Prior Publication Data
US 2016/0236703 A1 Aug. 18, 2016

(30) Foreign Application Priority Data
Feb. 13, 2015 (JP) ................................ 2015-026629

(51) Int. Cl.
| | | |
|---|---|---|
| *B62D 1/189* | (2006.01) | |
| *B62D 1/187* | (2006.01) | |
| *B62D 1/184* | (2006.01) | |
| *B62D 5/04* | (2006.01) | |

(52) U.S. Cl.
CPC ............ *B62D 1/187* (2013.01); *B62D 1/184* (2013.01); *B62D 1/189* (2013.01); *B62D 5/04* (2013.01); *F16C 2326/24* (2013.01)

(58) Field of Classification Search
CPC ........ B62D 1/187; B62D 1/189; B62D 1/184; B62D 1/183; B62D 1/18; B62D 1/16; F16C 2326/24
USPC ..................... 74/493, 492; 280/775, 779, 780
See application file for complete search history.

(56) References Cited

U.S. PATENT DOCUMENTS

| | | | | |
|---|---|---|---|---|
| 3,700,257 A | * | 10/1972 | Hurlburt .................. | B62D 1/16 280/775 |
| 9,016,420 B1 | * | 4/2015 | Gauthier ................ | B62M 27/02 180/190 |
| 2004/0163879 A1 | * | 8/2004 | Segawa ................ | B62D 5/0409 180/444 |
| 2005/0199086 A1 | * | 9/2005 | Magrini .................. | B62D 1/20 74/492 |
| 2007/0278777 A1 | * | 12/2007 | Liu .......................... | B62D 1/16 280/775 |
| 2010/0242663 A1 | * | 9/2010 | Takezawa .............. | B62D 1/184 74/493 |

(Continued)

FOREIGN PATENT DOCUMENTS

JP 2009-179070 A 8/2009

*Primary Examiner* — Keith J Frisby
(74) *Attorney, Agent, or Firm* — Honda Patents & Technologies North America, LLC; Gregory J. Burke

(57) ABSTRACT

A tilt steering apparatus includes a steering column having a tube member housing a steering shaft and rotatably installed on a body frame for tilt about a steering column tilt axis. Between a steering gearbox and the steering shaft, the apparatus includes a first universal joint secured to the steering shaft, an intermediate shaft and a second universal joint. The first universal joint includes a swing center defining a steering shaft tilt axis. Bearings rotatably support the steering shaft within the steering column tube and elastic members engage with the bearings to flex for axial movement of the steering shaft in the steering column tube. This relative movement accommodates an offset between the steering shaft and steering column tilt axes, thereby avoiding an increase in thrust load between the shaft and column during tilt for improved steerability.

19 Claims, 11 Drawing Sheets

(56) References Cited

U.S. PATENT DOCUMENTS

2015/0183460 A1\* 7/2015 Oyama ................ B62D 15/025
                                                                               701/41

\* cited by examiner

TILT STEERING APPARATUS

CROSS REFERENCES TO RELATED APPLICATIONS

The present application claims priority under 35 U.S.C. §119 to Japanese Patent Application No. 2015-026629, filed Feb. 13, 2015, entitled "Tilt Steering Apparatus," the contents of which are incorporated herein by reference in their entirety.

TECHNICAL FIELD

The present invention relates to a tilt steering apparatus for a vehicle.

BACKGROUND

A known tilt steering apparatus for a vehicle includes an O-ring supporting a bearing of a steering shaft. The O-ring allows a swing center of a universal joint of the steering shaft to shift with respect to the central axis of a tilt center shaft. The O-ring prevents an increase in steering friction that would otherwise accompany a tilting operation.

However, deformation of the O-ring in such known structure is accompanied by rattling of the bearing, which is transmitted to rattling of a steering handle in a radial direction. Such rattling can change a steering feeling. What is needed is a tilt steering apparatus that can avoid such a problem and improve the steering feeling.

SUMMARY

According to one aspect of the invention, a tilt steering apparatus includes a steering shaft to which a steering handle is installed, a steering column having a cylindrical tube member housing and installed on a body frame for tilt around a tilt center shaft. An intermediate shaft is provided between a steering gearbox and the steering shaft, the intermediate shaft is installed to a first universal joint fixed to the steering shaft on one end side of the intermediate shaft, and on an another end side to a second universal joint whose movement in an axial direction relative to the body frame is limited. The steering shaft has opposite ends each rotatably supported by a bearing member for rotation of the steering shaft relative to the tube member of the steering column. The steering shaft engages with elastic members provided on axial-direction outer ends of both bearing members such that the elastic members flex to provide movement of the steering shaft within the steering column in an axially-aligned manner.

The elastic members may have elastic properties allowing the elastic members to contract a predetermined amount relative to a weight of the steering shaft and a weight of the steering handle and to absorb an axial-direction displacement of the steering shaft that accompanies a tilting operation.

The intermediate shaft may be connected via a second universal joint to a steering torque assist mechanism that assists a steering force.

The steering torque assist mechanism may be separated from the steering gearbox and independently supported on the body frame.

The steering column may include left and right arm portions connected to the tube member, each arm portion rotatably secured to a column installation bracket on the body frame, the steering shaft and the intermediate shaft connected to the first universal joint between the arm portions.

The apparatus may include a damper mechanism installed to a lower portion of the tube member, the damper mechanism arbitrarily locking a tilt position of the tube member of the steering column.

According to one aspect of the invention, the axial-direction displacement of the steering shaft relative to the steering column during the tilting operation that accompanies a shifting of the swing center of the first universal joint with respect to the center of the tilt center shaft is absorbed by the elastic members such that excessive thrust load and rattling due to abutment in the axial direction are avoided. As a result, steerability can be improved at a large tilt angle change.

The steering shaft can be aligned in the axial direction in a state where the steering handle is assembled thereto. This can improves assembly and maintenance of the universal joints.

Providing a steering torque assist mechanism that is independent of the steering column, can prevent a steering column vicinity from increasing in size, can ensure a space for a driver in the tilting operation, and can provide for enlarged tilt angle.

Separation of a steering torque assist mechanism from the steering gearbox can prevent a steering gearbox vicinity from increasing in size, can enable lengthening of a suspension rod that supports front wheels on the left and right to swing up and down, and a ride comfort can be improved by increasing a cushion stroke. Although a distance between the steering torque assist mechanism and the steering column may be shortened such that tilting conditions of the first and second universal joints become strict, the absorbing of the axial-direction displacement of the steering shaft relative to the steering column by the elastic members can improve steering force even for large tilt angles changes.

A fastening installation space of the steering shaft and the intermediate shaft to the first universal joint can be ensured to be wide, thereby improving assembly and maintenance properties.

The damper mechanism can avoid protruding to left- and right-side directions of the tube member of the steering column, thereby ensuring a space for a knee of a passenger during the tilting operation for improved steerability.

According to another aspect of the invention, a tilt steering apparatus includes a steering column having a cylindrical tube defining first and second end portions, the steering column rotatably supported for rotation of the steering column about a steering column tilt axis during a tilt operation. A steering shaft is at least partially housed within the steering column tube. A universal joint having a swing center is secured to an end of the steering shaft such that the swing center defines a steering shaft tilt axis for the steering shaft. The apparatus includes first and second bearing members respectively engaging the first and second end portions of the steering column tube, the bearing members rotatably supporting the steering shaft within the steering column tube for rotation of the steering shaft about a central axis of the steering shaft. The apparatus includes first and second elastic members operably engaged between the steering shaft and the first and second end portions of the steering column tube, respectively, to provide relative axial movement between the steering shaft and the steering column tube during the tilt operation so as to accommodate an offset between the steering shaft tilt axis and the steering column tilt axis.

The apparatus may include a C-ring received in an annular groove defined by the steering shaft and first thrust washer contacting an end face of the first bearing member, the first elastic member disposed between the C-ring and the first thrust washer. The apparatus may include a collar extending radially from the steering shaft and a second thrust washer contacting an end face defined by the second bearing member, the second elastic member disposed between the collar and the second thrust washer. Each elastic members may include a wave washer.

According to another aspect of the invention, a tilt steering apparatus includes a steering wheel, a steering shaft connected to the steering wheel, a steering gear assembly supported on a body frame and a linkage assembly connecting the steering shaft to the steering gear assembly. The linkage assembly includes a first universal joint secured to an end of the steering shaft, an intermediate shaft having a first end connected to the first universal joint, and a second universal joint secured to a second end of the intermediate shaft. The first universal joint includes a swing center defining a steering shaft tilt axis. A steering column including a cylindrical tube is pivotably connected to a support member fixed to the body frame for rotation of the steering column about a steering column tilt axis during a tilt operation. First and second bearings engaging opposite ends of the steering column tube for rotatable support of the steering shaft with respect to the steering column. First and second elastic members are operably engaged between the steering shaft and the opposite ends of the steering column tube and flex to provide axial movement of the steering shaft with respect to the steering column tube. The axial movement of the steering shaft accommodates an offset between the steering shaft tilt axis and the steering column tilt axis.

BRIEF DESCRIPTION OF THE DRAWING(S)

DETAILED DESCRIPTION

Figure 1:
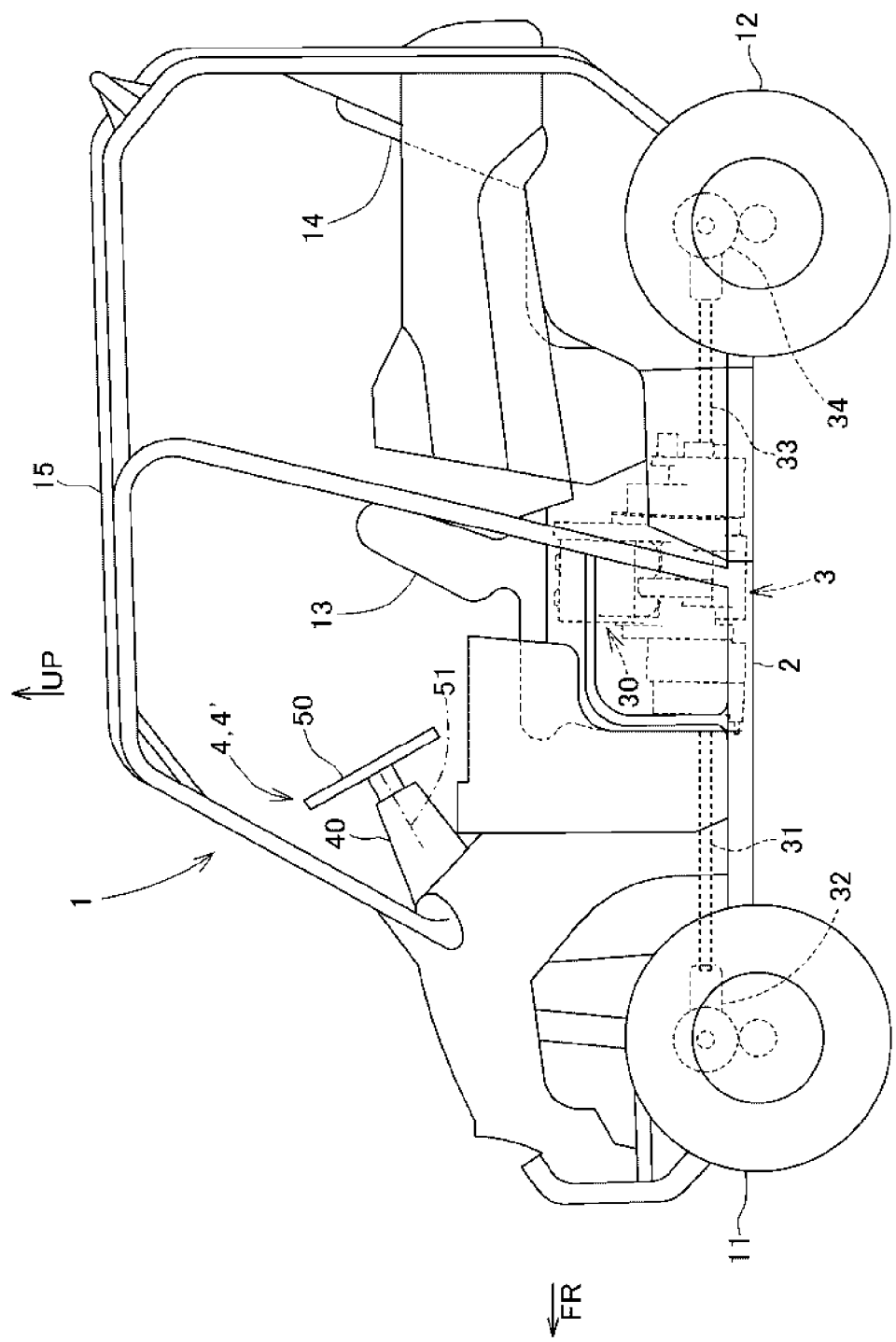
FIG. 1 is a left-side view of a vehicle provided with a tilt steering apparatus according to embodiment 1 or embodiment 2 of the present invention.

A tilt steering apparatus according to embodiment 1 of the present invention is described below based on FIGS. 1 to 8.

In the present embodiment, vehicle 1 is a four-wheel-drive off-road vehicle with roof 15 (referred to below simply as "vehicle") and is provided with a tilt steering apparatus 4.

As is the case in embodiment 2 described below, orientations of front, rear, left, right, up, and down are according to an orientation of the vehicle 1, and a straight-travel direction is forward.

The arrows FR, LH, RH, and UP in the drawings indicate front, left, right, and up, respectively, with respect to a vehicle.

As illustrated in FIG. 1, the vehicle 1 has front wheels 11, 11 and rear wheels 12, 12 on which off-road low-pressure balloon tires are mounted. The wheels are suspended on the left and right as pairs in a front and rear of a body frame 2.

A power unit 3 mounted in the vehicle 1 configures a power transmission apparatus by combining a transmission system to an inline two-cylinder water-cooled four-stroke internal combustion engine 30.

The power unit 3 is mounted in a central position (front-rear) along the body frame 2 in a so-called vertically-placed posture in which a crankshaft (not illustrated) of the internal combustion engine 30 is directed in a body front-rear direction.

An output shaft (not illustrated) of the power unit 3 extends to the front and rear. Rotational power of the output shaft is transmitted to the front wheels 11, 11 via a front driveshaft 31 and a front differential 32 and to the rear wheels 12, 12 via a rear driveshaft 33 and a rear differential 34.

A differential lock mechanism (not illustrated) is added to the front differential 32 and the rear differential 34 and a clutch incorporated in the front differential 32 engages and disengages power transmission to the front wheels 11, 11 to switch between two-wheel drive and four-wheel drive.

Front seats 13 are aligned on the left and right above the power unit 3 and rear seats 14 are disposed on a rear portion of the body frame 2.

The front seats 13 include a driver's seat. A steering column 40 is provided in front of the driver's seat facing rearward from the front of the vehicle 1. A steering handle 50 is installed on a steering shaft 51 (see FIG. 7) rotatably supported by the steering column 40.

The roof 15 covers the front seats 13 and the rear seats 14.

Figure 2:
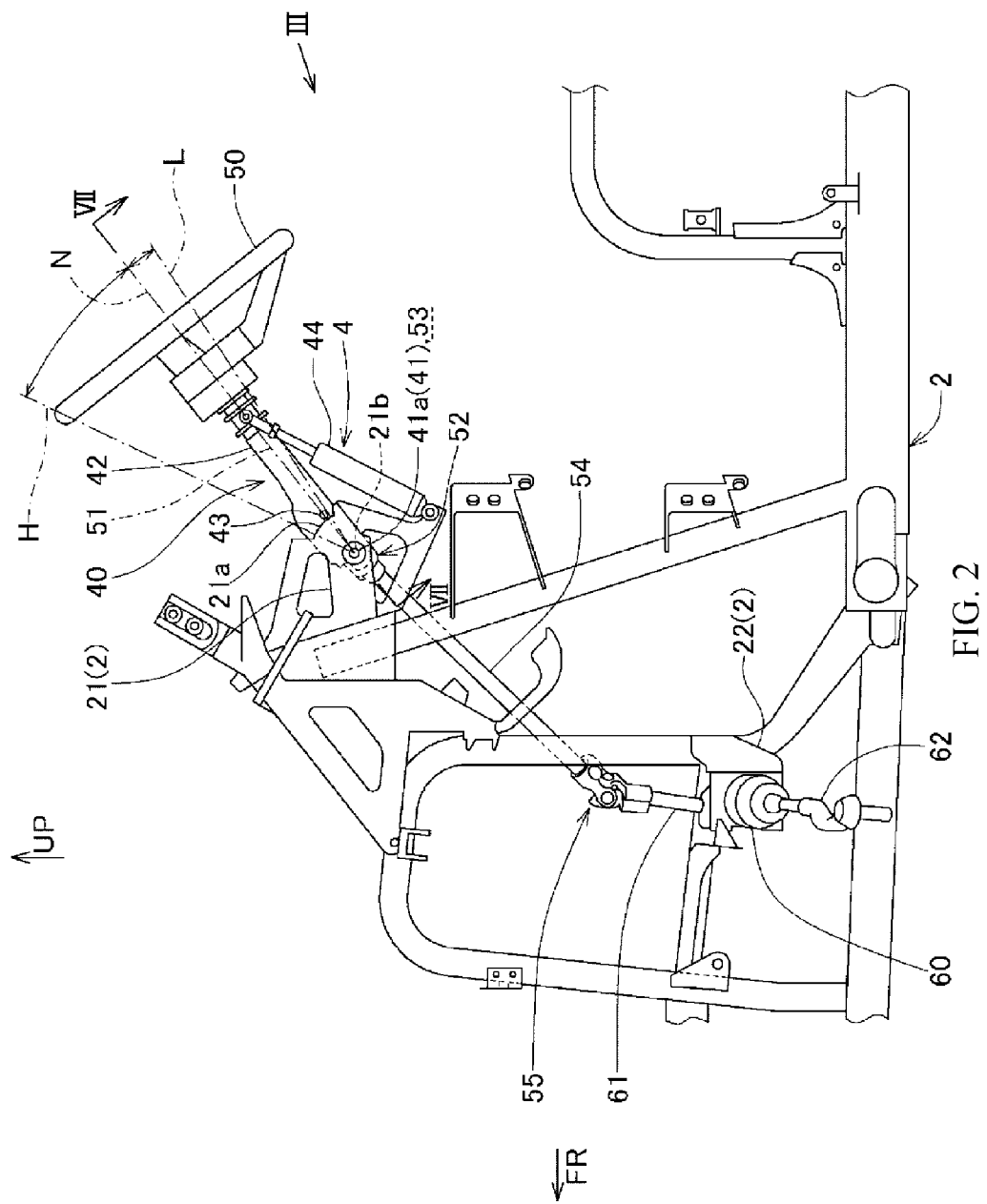
FIG. 2 is a left-side view showing the tilt steering apparatus and a body frame and a vicinity thereof according to embodiment 1 in FIG. 1.
Figure 3:
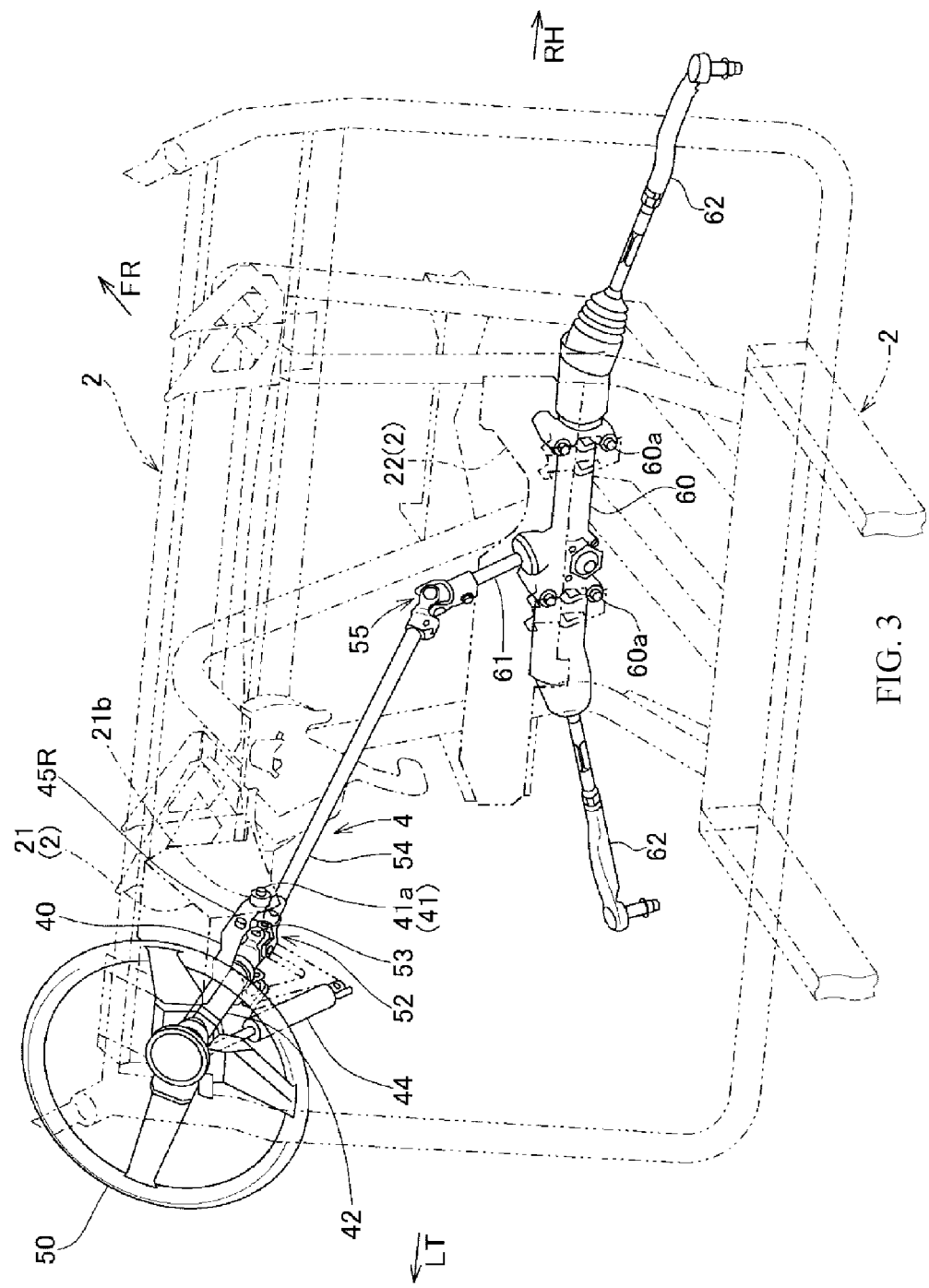
FIG. 3 is a perspective view from a rear-right point of view corresponding to arrow III in FIG. 2 of the tilt steering apparatus and the body frame and the vicinity thereof.

A configuration summary of the tilt steering apparatus 4 of embodiment 1 is described based on FIGS. 2 and 3.

The steering column 40 is installed on a column installation bracket 21. The installation bracket is provided in an upper-front portion of the body frame 2 so a rear portion of the steering column 40 can tilt up and down about tilt center shafts 41.

The steering column 40 has a cylindrical tube member 42 extending in a substantially front-rear direction and a steering shaft 51 rotatably supported within the tube member 42. A central axis of the steering shaft is illustrated in broken line in FIG. 2.

The steering handle 50 is installed on a rear end of the steering shaft 51 and a first universal joint 52 is secured to a front end of the steering shaft 51. The components are arranged such that a swing center 53 of the first universal joint 52 and central axes 41a of tilt center shafts 41 of the steering column 40 (see FIG. 7) are substantially aligned.

A rear end of an intermediate shaft 54 is secured to the first universal joint 52 and a second universal joint 55 is secured to a front end of the intermediate shaft 54.

A gearbox installation bracket 22 is provided on a lower-front portion of the body frame 2 and a steering gearbox 60 is secured by a bolt 60a to the gearbox installation bracket 22.

In the present embodiment, the steering gearbox 60 is of a rack-and-pinion type in which steering is performed as follows. Rotation for steering is transmitted to an input shaft 61 protruding upward at a substantial center of the steering gearbox 60. The rotation from input shaft 61 is converted into left-and-right movement of tie rods 62, 62 extending to the left and right of the steering gearbox 60. The movement of the tie-rods, which are secured to knuckle arms (not illustrated) associated with front-wheels 11, 11, results in swinging of the knuckle arms. The steering gearbox 60 may be of another type, such as a ball-and-nut type. Either type of steering gearbox is conventional and known and a detailed description thereof is omitted.

The second universal joint 55 is secured to the input shaft 61 of the steering gearbox 60.

Rotational movement of the steering handle 50 is transmitted to the steering gearbox 60 via a linkage assembly including the steering shaft 51, the first universal joint 52, the intermediate shaft 54, the second universal joint 55, and the input shaft 61. The rotation is then converted into left-and-right movement of the tie rods 62, 62 on the left and right in the steering gearbox 60 for steering of the front wheels 11, 11 via the knuckle arms.

As illustrated in FIG. 2, the tiltable support of steering column 40 provided by tilt center shafts 41 on the column installation bracket 21 allows for tilting movement of the steering column from a reference position N upwardly to an upper-limit position H or downwardly to a lower-limit position L. The rotatable support of the steering shaft 51 by the tube member 42 is continued throughout the range of tilting movement of the steering column between the upper and lower limit positions.

A stopper 43 is provided on each side of steering column 40. The upper-limit position H and the lower-limit position L of the steering column 40 are defined by the stoppers 43 contacting upper and lower ends of a notched concave portion 21a also provided on each side of column installation bracket 21.

A free-lock type gas damper (also referred to as "damper mechanism") 44 for arbitrarily locking a tilt position in a tilting operation is provided between the column installation bracket 21 and the tube member 42 of the steering column 40. With the free-lock type gas damper 44, the steering column 40 can be locked at any position between the upper-limit position H and the lower-limit position L.

In the first embodiment, as shown in FIGS. 2 and 3, an upper end of the free-lock type gas damper 44 is installed to a side portion of the tube member 42 of steering column 40. To avoid the damper 44 protruding to the left or right side of tube member 42, the damper may be installed to a lower portion of the tube member 42 as in embodiment 2 illustrated in FIGS. 9 to 11. By avoiding gas damper 44 protruding to left or right sides of tube member 42, space for a knee Pa of a passenger P is ensured in the tilting operation for improving steerability (see FIG. 11).

The first universal joint 52 is secured to the front end of the steering shaft 51 and to a rear end of the intermediate shaft 54.

Meanwhile, the front end of the intermediate shaft 54 is secured to the second universal joint 55. However, because the second universal joint 55 is secured to the input shaft 61 of the steering gearbox 60, movement of the second universal joint 55 in an axial direction relative to the body frame 2 is limited.

As described above, the swing center 53 of the first universal joint 52 is secured to the rear-end side of the intermediate shaft 54. Axial movement of the steering shaft 51, which is secured to the first universal joint 52, is therefore limited. Arranged in this manner, the swing center 53 defines a steering shaft tilt pivot axis in a tilting operation of the steering shaft 51.

As described above, the tilt center shafts 41 of the steering column 40 are installed in tilt center holes 21b provided in the column installation bracket 21 of the body frame 2 such that the positions of the tilt center shafts relative to the body frame 2 are fixed. Arranged in this manner, the central axes 41a for the tilt center shafts 41 define a steering column tilt pivot axis in a tilting operation of the steering column 40.

Figure 4:
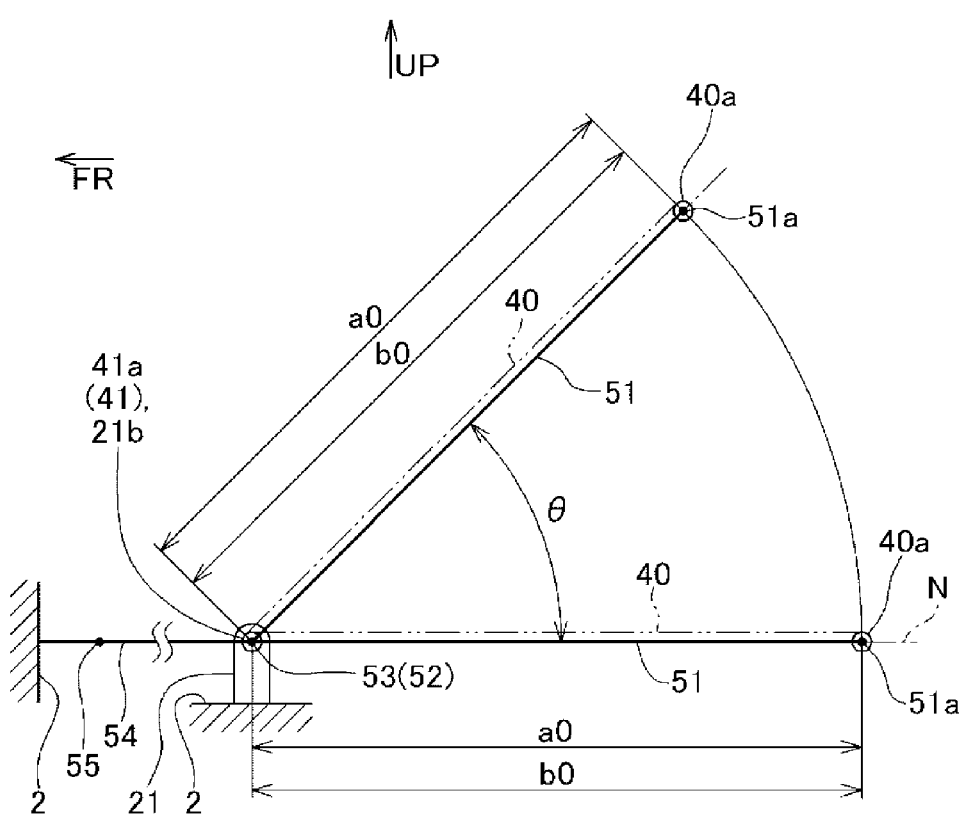
FIG. 4 is a schematic view illustrating an example of a tilting operation state of a steering column and a steering shaft in a situation where there is no shift of a swing center of a first universal joint with respect to a central axis of a tilt center shaft.

Referring to the schematic illustration of FIG. 4, the steering column 40 includes a shaft engagement portion 40a where the steering column 40 is engaged to the steering shaft 51. Steering shaft 51 includes a column engagement portion 51a where the steering shaft is engaged to the steering column 40. A distance from the central axes 41a of the tilt center shafts 41a to the shaft engagement portion 40a is shown as b0. A distance from the swing center (steering shaft tilt pivot axis) 53 to the column engagement portion 51a is shown as a0. If the central axes 41a of the tilt center shafts 41a of steering column 40 are set to align with the swing center 53 of the first universal joint 52, the distance b0 will be equal to distance a0.

In an upward tilting operation of the steering column 40 of θ degrees from the reference position N, the column engagement portion 51a of the steering shaft 51 will be tilt operated according to the shaft engagement portion 40a. As should be understood when viewed in a tilt-center-shaft 41 direction as shown in FIG. 4, the shaft engagement portion 40a and the column engagement portion 51a will rotate at respective radii b0, a0 around the column and shaft tilting pivot axes 41a, 53. Because the pivot axes 41a, 53 are in the same position (i.e., substantially aligned), the radius b0 for shaft engagement portion 40a will be equal to the radius a0 for column engagement portion 51a. Because the relative position between engagement portions 51a, 40a remains the same after tilting, there is no axial-direction displacement of the steering shaft 51 relative to the steering column 40 that accompanies the tilting operation.

Therefore, during the tilting operation, the pivoting of the steering column 40 about the column tilt pivot axis 41a, and the swinging of the steering shaft 51 around the swing center 53 of the first universal joint 52 in the tube member 42 of the steering column 40 are matched and are performed without interference.

However, it is difficult to avoid a minute shift in assembly creating an offset c (see FIG. 7) between the shaft tilt pivot axis defined by the swing center 53 of the first universal joint 52, which is installed to the gearbox installation bracket 22 in the lower-front portion of the body frame 2 via the steering gearbox 60, the second universal joint 55, and the intermediate shaft 54, and the column tilt pivot axis defined by the central axes 41a of the tilt center shafts 41, which is installed in the tilt center holes 21b provided separately in the column installation bracket 21 in the upper-front portion of the body frame 2.

When a tilting operation results in an axial-direction displacement of the steering shaft 51 relative to the steering column 40, a thrust load or rattling in the axial direction may occur in the engagement portions 51a, 40a between the steering shaft 51 and the steering column 40. As described above, the axial-direction positions of the steering shaft 51 and steering column 40 are separately determined by their respective connections to the body frame 2. Such a situation can present concerns of an influence on a steering force in conjunction with the tilting and a reduction in steerability for large tilt angle changes.

Actual conditions for the above-described offset c and associated thrust load or rattling will vary. However, tilting-operation states of simplified examples are schematically illustrated in FIGS. 5A, 5B, 6A and 6B each representing a view in the direction of the column tilting pivot axis.

In the schematic illustrations of FIGS. 5A, 5B, 6A and 6B, the slight offset c between the shaft and column pivot axes is respectively shown as c1 to c4, the axial-direction displacement is respectively shown as d1 to d4, and the tilting-operation angle is shown as θ.

Figure 5A:
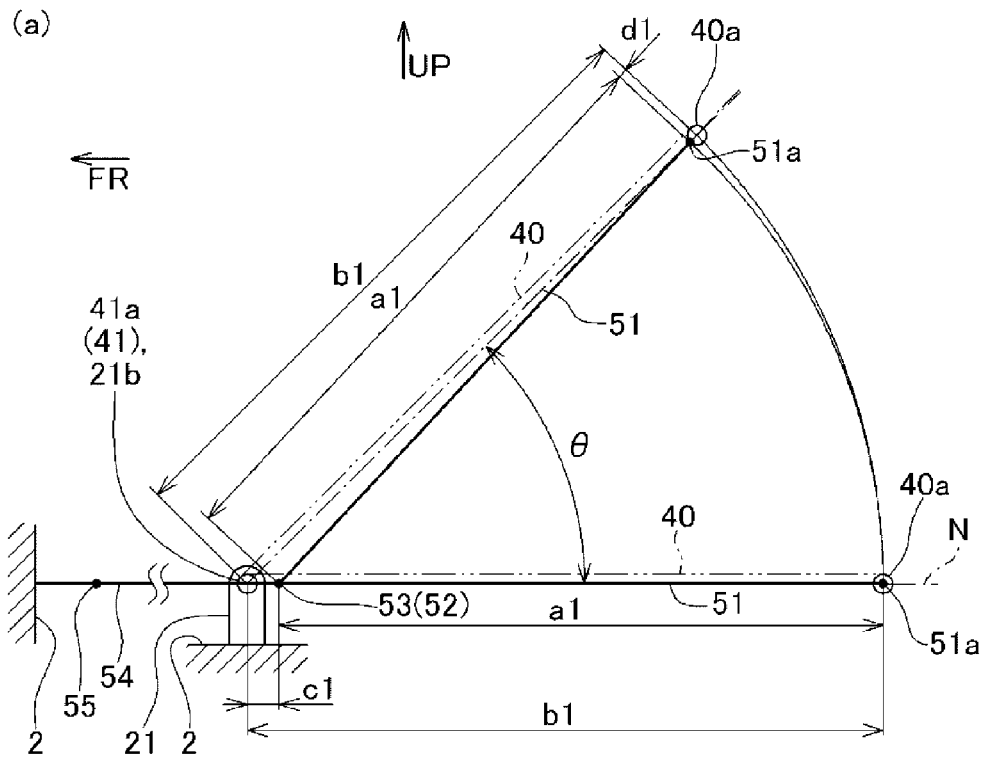
FIGS. 5A and 5B are schematic views illustrating examples of a tilting operation state of the steering column and the steering shaft in situations where there is a shift of the swing center of the first universal joint creating an offset in a front-to-rear direction between a steering column tilting pivot axis and a steering shaft tilting pivot axis.

FIG. 5A illustrates a situation in which the central axes 41a of the tilt center shafts 41 of steering column 40 are shifted slightly to a body front side (intermediate-shaft 54 side) relative to the swing center 53 of the first universal joint 52 as shown by an offset amount c1. In other words, the steering column tilt pivot axis is shifted to a body front side relative to the steering shaft tilt pivot axis by the offset c1.

In FIG. 5A, the column engagement portion 51a of steering shaft 51 and the shaft engagement portion 40a of steering column are matched in position at the reference position N. The distance between the swing center 53 of first universal joint 52 (the steering shaft tilt pivot axis) to the column engagement portion 51a of steering shaft 51 is shown as a1, and the distance between the central axes 41a of the tilt center shafts 41 of steering column 40 (the steering column tilt pivot axis) to the shaft engagement portion 40a of steering column 40 is shown as b1. However, b1 is longer than a1 by the offset c1 due to the relative shifting of the pivot axes (i.e., b1=a1+c1).

In a tilting operation, the movement of the shaft engagement portion 40a of steering column 40 results in movement of the column engagement portion 51a of steering shaft 51. When the steering column 40 of FIG. 5A is tilt operated θ degrees upward from the reference position N around the central axes 41a of the tilt center shafts 41, the shaft engagement portion 40a of steering column 40 rotates at a radius b1.

During the upward tilting operation of FIG. 5A, the column engagement portion 51a of steering shaft 51 attempts to rotate around the steering shaft tilt pivot axis 53 at a rotation radius equal to a1 as the steering engagement portion 40a of steering column 40 is rotated around the steering column tilt pivot axis 41a at a rotation radius equal to b1. However, the rotation radius a1 is shorter than the rotation radius b1 by the offset c1. Because of the differing rotational radii, the column engagement portion 51a of steering shaft 51 will be shifted by an axial-direction displacement d1 towards a shaft-tilt-operation-center 53 side with respect to the shaft engagement portion 40a of steering column 40 following an upward tilt of θ degrees.

The axial-direction displacement d1 of the steering shaft 51 relative to the steering column 40 caused by the interfering rotational radii a1, b1 during the upward tilt operation might result in a thrust load or rattling in a pressure-bearing (i.e., axial) direction between the engagement portions 40a, 51a.

Figure 5B:
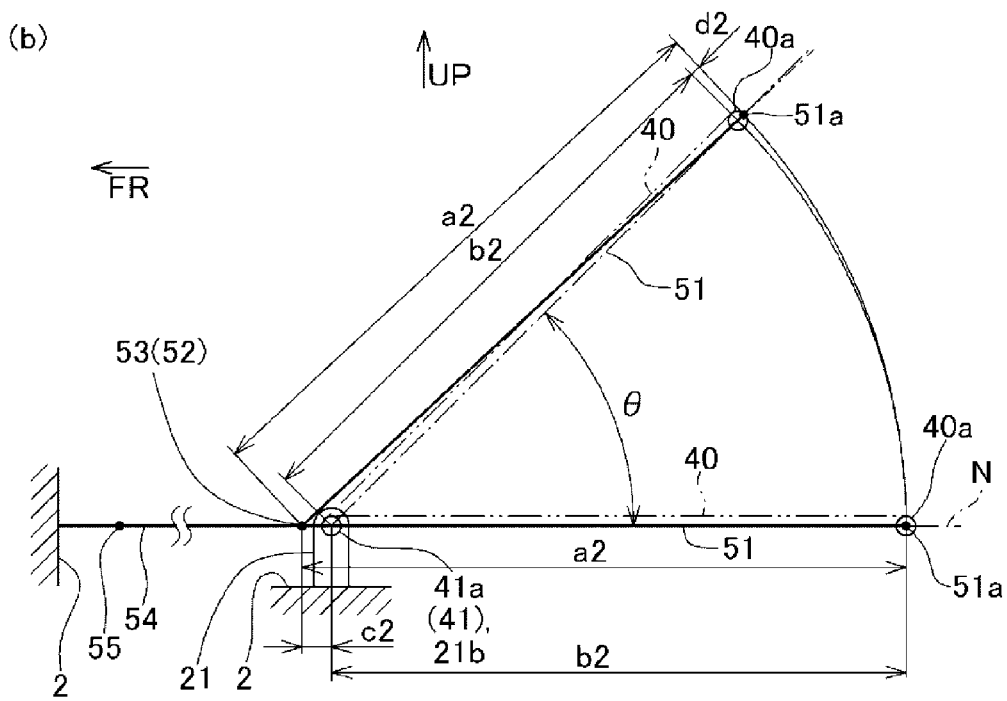

FIG. 5B illustrates a situation where the central axes 41a of the tilt center shafts 41 of steering column 40 are shifted slightly to a body rear side (steering-shaft 51 side) relative to the swing center 53 of first universal joint 52 by an offset amount c2. In other words, the steering column tilt pivot axis is shifted rearwardly relative to the steering shaft tilt pivot axis by offset c2.

In FIG. 5B, the column engagement portion 51a of steering shaft 51 and the shaft engagement portion 40a of steering column 40 are matched in position at the reference position N. The distance between the swing center 53 of first universal joint 52 (the steering shaft tilt pivot axis) to the column engagement portion 51a of steering shaft 51 is shown as a2, and the distance between the central axes 41a of the tilt center shafts 41 of steering column 40 (the steering column tilt pivot axis) to the shaft engagement portion 40a of steering column 40 is shown as b2. However, b2 is shorter than a2 by the offset c2 due to the relative shifting of the pivot axes (b2=a2−c2).

When the steering column 40 is tilt operated θ degrees upward from the reference position N around the central axes 41a of the tilt center shafts 41, the shaft engagement portion 40a of steering column 40 rotates at a radius b2.

During the upward tilting operation of FIG. 5B, the column engagement portion 51a of steering shaft 51 attempts to rotate around the steering shaft tilt pivot axis 53 at a rotation radius equal to a2 as the column engagement portion 40a of steering column 40 is rotated around the steering column tilt pivot axis 41a at a rotation radius equal to b2. However, the rotation radius a2 is longer than the rotation radius b2 by the offset c2. Because of the differing rotational radii, the column engagement portion 51a of steering shaft 51 will be shifted by an axial-direction displacement d2 in a direction away from the steering shaft tilt pivot axis 53 with respect to the shaft engagement portion 40a of steering column 40 following an upward tilt of θ degrees.

Similar to the above-described axial-direction displacement d1, the axial-direction displacement d2 of the steering shaft 51 relative to the steering column 40 caused by the interfering rotational radii a2, b2 during the upward tilt operation of FIG. 5B might result in thrust loading or rattling in the axial direction between the engagement portions 40a, 51a.

Figure 6A:
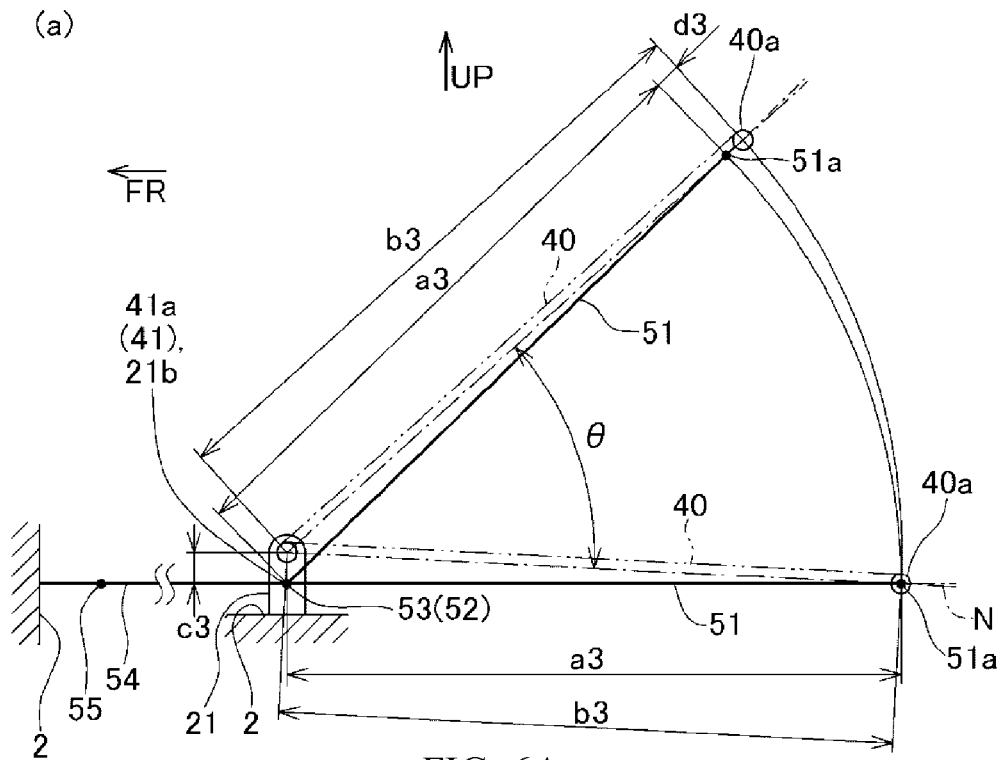
FIGS. 6A and 6B are schematic views illustrating examples of a tilting operation state of the steering column and the steering shaft in situations where there is an offset in an up-and-down direction between the steering column tilting pivot axis and the steering shaft pivot axis.

FIG. 6A illustrates a situation where the central axes 41a of the tilt center shafts 41 of steering column 40 are shifted slightly to a body upper side relative to the swing center 53 of the first universal joint 52 by an offset amount c3. In other words, the steering column tilt pivot axis is shifted upwardly relative to the steering shaft tilt pivot axis by offset c3.

In FIG. 6A, the column engagement portion 51a of steering shaft 51 and the shaft engagement portion 40a of steering column 40 are matched in position at the reference position N. The distance between the swing center 53 of the first universal joint 52 (the steering shaft tilt pivot axis) to the column engagement portion 51a of steering shaft 51 is shown as a3, and the distance between the central axes 41a of the tilt center shafts 41 of steering column 40 (the steering column tilt pivot axis) to the shaft engagement portion 40a of steering column 40 is shown as b3. However, as shown in FIG. 6A, the distance b3 is slightly longer than the distance a3 as a result of the upward shifting of the central axes 41a of the tilt center shafts 41 (the steering column tilt pivot axis) with respect to the swing center 53 (the steering shaft tilt pivot axis) (i.e., b3>a3).

When the steering column 40 is tilt operated θ degrees upward from the reference position N around the central axes 41a of the tilt center shafts 41, the shaft engagement portion 40a of steering column 40 rotates at a radius b3.

During the upward tilt operation of FIG. 6A, the column engagement portion 51a of steering shaft 51 attempts to rotate around the steering shaft tilt pivot axis 53 at a rotation radius equal to a3 as the steering shaft engagement portion 40a of steering column 40 is rotated around the steering column tilt pivot axis 41a at a rotation radius equal to b3. As shown, however, the rotation radius a3 for steering shaft 51 is slightly shorter than the rotation radius b3 for the steering column 40. Because the rotation radii a3, b3 differ in length, and because the steering shaft tilt pivot axis 53 is positioned below the steering column tilt pivot axis 41a (i.e., in a direction opposite the upward tilt direction of FIG. 6A), the column engagement portion 51a will be shifted by an axial-direction displacement d3 toward the steering shaft tilt pivot axis 53 relative to the shaft engagement portion 40a.

Similar to the above-described axial-direction displacements d1, d2, the axial-direction displacement d3 of the steering shaft 51 relative to the steering column 40 caused during the upward tilt operation of FIG. 6A might result in thrust loading or rattling in the axial direction between the engagement portions 40a, 51a.

Figure 6B:
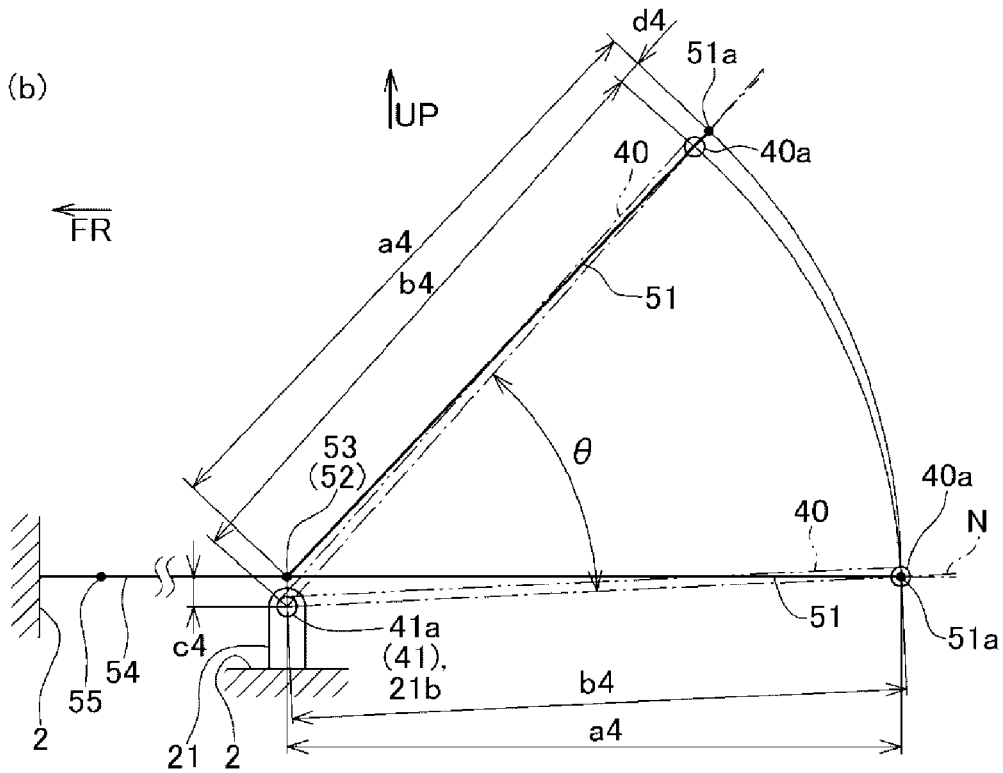

FIG. 6B illustrates a situation where the central axes 41a of the tilt center shafts 41 of steering column 40 are shifted slightly to a body lower side relative to the swing center 53 of the first universal joint 52 by an offset amount c4. In other words, the steering column tilt pivot axis is shifted downwardly relative to the steering shaft tilt pivot axis by offset c3.

In FIG. 6B, the column engagement portion 51a of the steering shaft 51 and the shaft engagement portion 40a of the steering column are matched in position at the reference position N. The distance between the swing center 53 of the first universal joint 52 (the steering shaft tilt pivot axis) to the column engagement portion 51a is shown as a4, and the distance between the central axes 41a of the tilt center shafts 41 of steering column 40 (the steering column tilt pivot axis) to the shaft engagement portion 40a is shown as b4. However, as shown in FIG. 6B, the distance b4 is slightly longer than the the distance a4 due to the downward shifting of the central axes 41a of the tilt center shafts 41 (the steering column tilt pivot axis) with respect to the swing center 53 (the steering shaft tilt pivot axis) (i.e., b4>a4).

When the steering column 40 is tilt operated θ degrees upward from the reference position N around the central axes 41a of the tilt center shafts 41, the shaft engagement portion 40a of steering column rotates at a radius b4.

During the upward tilt operation of FIG. 6B, the column engagement portion 51a of steering shaft 51 attempts to rotate around the steering shaft tilt pivot axis 53 at a rotation radius equal to a4 as the shaft engagement portion 40a of steering column is rotated around the steering column tilt pivot axis 41a at a rotation radius equal to b4. Despite the rotation radius a4 the steering shaft 51 being slightly shorter than b4, the column engagement portion 51a of steering shaft 51 is shifted by an axial-direction displacement d4 in a direction away from the steering shaft tilt pivot axis 53 relative to the shaft engagement portion 40a of steering column 40. The shift of the column engagement portion 51a in the direction away from steering shaft tilt pivot axis 53 occurs because of the positioning of the steering shaft tilt pivot axis 53 above the steering column tilt pivot axis 41a (i.e., in a direction towards the upward tilt direction of FIG. 6A).

Similar to the displacments d1, d2 and d3, the axial-direction displacement d4 of the steering shaft 51 relative to the steering column 40 caused during the upward tilt operation of FIG. 6B might result in thrust loading or rattling in the axial direction between the engagement portions 40a, 51a.

It should be understood that in a reversed set of situations in which the tilt direction is downward from the reference position N, a compound of the above shifts can be assumed. For the offset situations of FIGS. 5A and 5B, the relative shifting of the column engagement portion 51a would be in the same direction during a downward tilt operation compared to the upward tilt operation (i.e., towards the shaft tilt pivot axis 53 in FIG. 5A and away from the pivot axis 53 in FIG. 5B). However, for the offset situations of FIGS. 6A and 6B, the relative shifting of the column engagement portion 51a would be in the opposite direction during a downward tilt operation compared to the upward tilt operation (i.e., away from the pivot axis 53 in FIG. 6A and towards the pivot axis 53 in FIG. 6B). This change in the relative direction of the axial-direction displacement d would occur because the relative direction of the vertical offset c with respect to the tilt direction has changed (i.e., the upward shifting of the column tilt pivot axis 41a in FIG. 6A would now be in a direction opposite to the downward tilt direction, while the downward shifting of the pivot axis 41a in FIG. 6B would now be in the same direction as the downward tilt direction). In any such situation, however, axial-direction displacements of the steering shaft 51 relative to the steering column 40 would arise along with the possibility of thrust loading or rattling in the axial direction between the engagement portions 40a, 51a.

The tilt steering apparatus 4 of the present embodiment is provided with a characteristic configuration described below addressing thrust loading and rattling concerns associated with the above-described axial-direction displacment.

Figure 7:
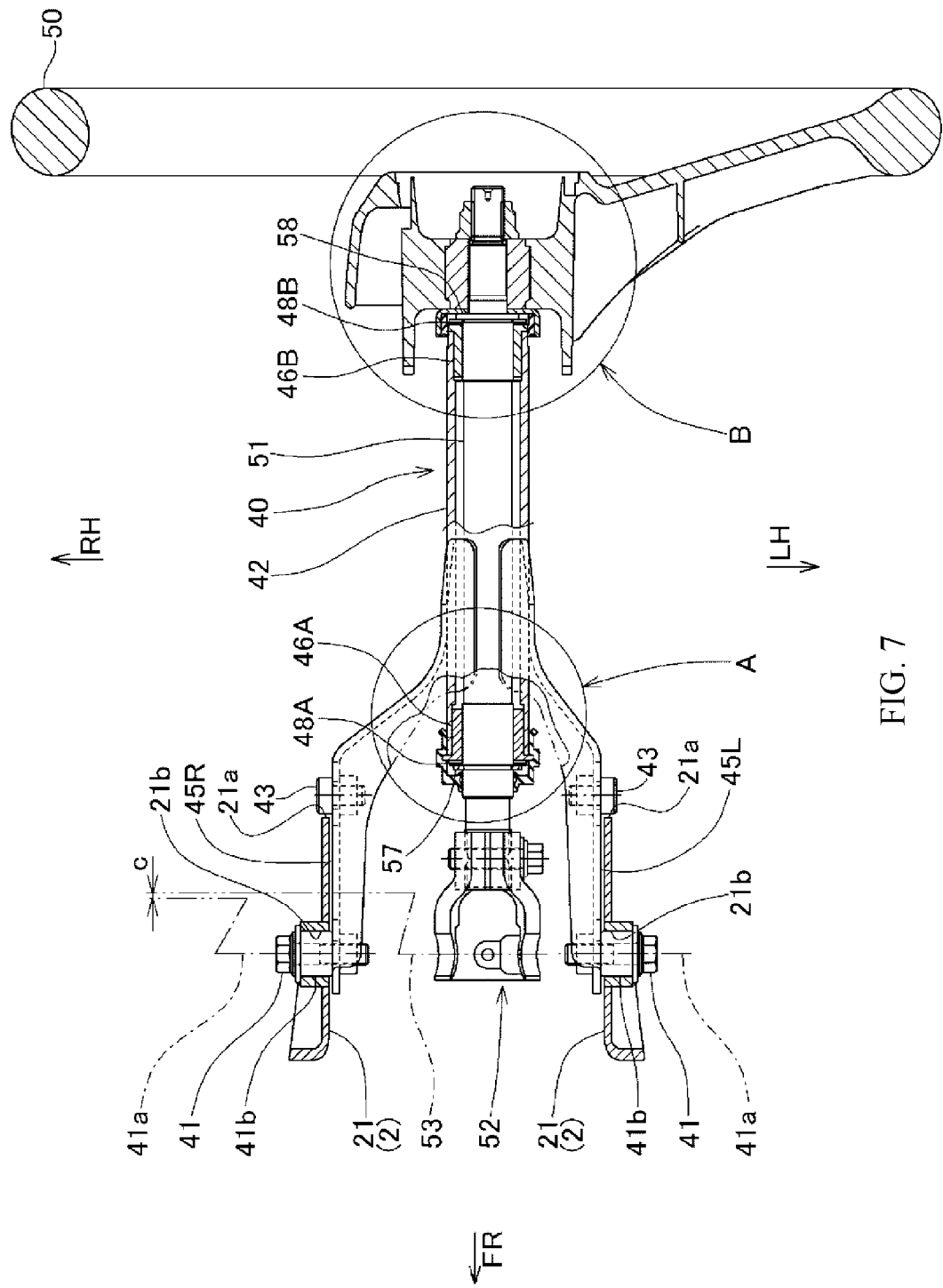
FIG. 7 is a top cross-sectional view taken along lines VII-VII in FIG. 2 of the steering column, the steering shaft, and a vicinity thereof.

Referring to FIG. 7, there is shown a top cross-sectional view of the steering column 40, the steering shaft 51, and a vicinity thereof taken along the lines VII-VII in FIG. 2.

The steering column 40 is provided with the cylindrical tube member 42 housing the steering shaft 51, and left and right arm portions 45L, 45R integrally fixed to the tube member 42 and provided in a vehicle-width direction.

The left and right arm portions 45L, 45R are interposed by the column installation bracket 21 of body frame 2 from left and right outer sides. Each of the arm portions 45L, 45R is fastened to the column installation bracket 21 by a threaded fastener (e.g., a bolt) providing one of the tilt center shafts 41. The shaft portions of the bolts (i.e., the tilt center shafts 41) penetrate from left and right outer sides into the tilt center holes 21b of column installation bracket 12. A bushing 41b mounted in each of the tilt center holes 21b receives the tilt center shaft 41 of one of the bolts to provide relative rotation between the left and right arm portions 45L, 45R and the column installation bracket 21.

That is to say, the steering column 40 is supported on the column installation bracket 21 by the bolts providing tilt center shafts 41 and is able to tilt relative to the column installation bracket 21 through the bushings 41b around the central axes 41a defined by the tilt center shafts 41.

As described above, the stoppers 43 provided on the left and right arm portions 45L, 45R establish upper-limit and lower-limit positions H, L for the tilting of the steering column 40 through contact with upper and lower ends of the notched concave portions 21a provided on the column-installation-bracket 21 (see FIG. 2).

As above, the tube member 42 is rotatably installed on the column installation bracket 21 through arm portions 45L, 45R provided in the car-width direction, and the steering shaft 51 and the intermediate shaft 54 are connected to each other between the arm portions 45L, 45R through the first universal joint 52. Therefore, a wide fastening installation space for the steering shaft 51 and the intermediate shaft 54 to the first universal joint 52 is ensured by the left and right arm portions 45L, 45R, improving assembly and maintenance properties.

The steering shaft 51, which is inserted through the tube member 42, has end sides held by a front-side bearing member ("bearing member") 46A and a rear-side bearing member ("bearing member") 46B. The bearing members 46A, 46B are fitted to inner peripheries of front and rear end portions of the tube member 42 so as to be able to rotate.

The front-side bearing member 46A and the rear-side bearing member 46B are slide bearings of a bushing shape.

The steering shaft 51 extends forward past the front-side bearing member 46A to secure to the first universal joint 52, and extends rearward past the rear-side bearing member 46B to fasten to the steering handle 50.

As described above, the steering column 40 pivots around the central axes 41a of the tilt center shafts 41 during a tilting operation and the steering shaft 51 swings around the swing center 53 of the first universal joint 52. Although the central axes 41a of the tilt center shafts 41 and the swing center 53 of the universal joint 52 are set to match, some form of axis shifting (such as c1 to c4 of FIGS. 5 and 6) and associated axial-direction displacement of the steering shaft 51 relative to the steering column 40 (such as d1 to d4) may arise.

FIG. 8A is an enlarged cross-sectional view of portion A in FIG. 7 illustrating structure near the front-side bearing member 46A. FIG. 8B is an enlarged cross-sectional view of portion B in FIG. 7 illustrating structure near the rear-side bearing member 46B.

Referring to FIG. 8A, the front-side bearing member 46A is a slide bearing provided with a flange portion 46Aa on an axial-direction outer end. A rear side of the flange portion 46Aa abuts to a front-end portion of the tube member 42 of steering column 40. A portion of front-side bearing member 46A is fitted to an inner peripheral surface of the tube member 42. An inner-peripheral-surface side of the bearing member 46A rotatably supports the front-end side of the steering shaft 51.

A thrust washer 47A and a wave washer ("elastic member") 48A are mounted on the steering shaft 51 in that order on a front side of the flange portion 46Aa of front-side bearing member 46A. The thrust washer 47A and the wave washer 48A are held between the flange portion 46Aa of bearing member 46A and a C-ring 57 mounted in an annular groove 56 provided in a peripheral surface of steering shaft 51.

The wave washer 48A is formed in wave-like manner with periodic peak and valley portions in a peripheral direction. The wave washer 48A is an elastic member that flexes under compressive force in an axial direction to deform in a direction that collapses the peak and valley portions. Conversely, the wave washer 48A in a collapsed condition will impart an expansive force in the axial direction to adjacent components as the peak and valley portions tend towards restoration. The wave washer 48A itself is known, and detailed description thereof is omitted.

An annular seal member 49 is locked on an outer peripheral end of the flange portion 46Aa of the front-side bearing member 46A. The seal member 49 covers the thrust washer 47A, the wave washer 48A and the C-ring 57 to protect from dust and the like.

As described above, the first universal joint 52 is fixed on a forward end of the steering shaft 51.

An axial-direction position of the flange portion 46Aa of front-side bearing member 46A is controlled by the tube member 42 of steering column 40. An axial-direction position of the C-ring 57, which is an engagement member interposing the thrust washer 47A and wave washer 48A for mutual positioning, is controlled by the steering shaft 51. The flange portion 46Aa corresponds to the shaft engagement portion 40a of steering-column 40 side described above, and the C-ring 57 corresponds to the column engagement portion 51a of steering shaft 51.

Therefore, when a shifting operation is performed θ degrees from the reference position N, the column engagement portion 51a (C-ring 57) will shift an axial-direction displacement corresponding to d1 through d4 in FIGS. 5A, 5B, 6A, and 6B. In the situations of FIGS. 5A and 6A, C-ring 57 will shift by an axial-direction displacement da (not illustrated) towards the shaft tilt pivot axis 53 (swing center of first universal joint 52) from the flange portion 46Aa (shaft engagement portion 40a) (see FIG. 7). A space between the C-ring 57 and the flange portion 46Aa will expand from the spacing at the reference position N by the axial-direction displacement da to accommodate the displacement.

At the reference position N, therefore, the wave washer 48A is mounted in a compressed state allowing expansion of the wave washer by an amount at least corresponding to the axial-direction displacement da. The flexing of the wave washer allows the steering shaft 51 to move the predetermined distance da in the axial direction. Therefore, although the space between the C-ring 57 and the flange portion 46Aa is increased during the shifting operation, the steering shaft 51 remains aligned in the axial direction within the tube member 42 of steering column 40 such that rattling is prevented.

In the situations of FIGS. 5B and 6B, the shaft engagement portion 40a (flange portion 46Aa) will shift an axial-direction displacement db (not illustrated) corresponding to d2 and d4 toward the shaft tilt pivot axis 53 (swing center of first universal joint 52) from the column engagement portion 51a (C-ring 57) during a shifting operation from the reference position N (see FIG. 7). The space between the C-ring 57 and the flange portion 46Aa will be contracted by an amount equal to the axial-direction displacement db from the situation at the reference position N.

At the reference position N, therefore, the wave washer 48A is mounted in a state in which the washer can be compressively deformed by at least an amount corresponding to the axial-direction displacement db. The flexing of the wave washer allows the steering shaft to move the predetermined distance db in the axial direction. Therefore, although the space between the C-ring 57 and the flange portion 46Aa contracts during the shifting operation, the steering shaft 51 remains aligned in the axial direction within the tube member 42 of steering column 40 and and excessive thrust loading due to an abutment between C-ring 57 and flange portion 46Aa is prevented.

Referring to FIG. 8B, the rear-side bearing member 46B is a slide bearing provided with a flange portion 46Ba on an axial-direction outer end. A front side of the flange portion 46Ba abuts the rear-end portion of the tube member 42 of steering column 40. The rear-side bearing member 46B is fitted to the inner peripheral surface of tube member 42 and rotatably supports the rear-end side of the steering shaft 51 on an inner peripheral surface of the bearing member.

A thrust washer 47B and a wave washer ("elastic member") 48B are mounted on the steering shaft 51 in that order on a rear side of the flange portion 46Ba of rear-side bearing member 46B. The thrust washer 47B and wave washer 48B are held between an annular collar portion 58 provided on steering shaft 51 and the flange portion 46Ba.

Similar to wave washer 48A, the wave washer 48B is itself known and detailed description is omitted.

Rearwardly of the annular collar portion 58, the steering shaft 51 engages a spline portion 50b formed in a bushing-member 50a in center portion of steering handle 50. The steering handle 50 is secured to the steering shaft 51 by a nut 50c.

The thrust washer 47B, the wave washer 48B, and the annular collar portion 58 are covered by an annular seal member 59, which is interposed by the annular collar portion 58 and bushing member 50a of steering handle 50, to protect from dust and the like.

An axial-direction position of the flange portion 46Ba of rear-side bearing member 46B is controlled by the tube member 42 of steering column 40. The annular collar portion 58, having an axial-direction position established by the steering shaft 51, interposes the thrust washer 47B and the wave washer 48B for mutual positioning. The flange portion 46Ba of rear-side bearing member 46B corresponds to the shaft engagement portion 40a of steering-column 40 and the annular collar portion 58 of steering shaft corresponds to the column engagement portion 51a of steering shaft 51.

In the situation of FIGS. 5A and 6A, the column engagement portion 51a (annular collar portion 58) shifts an axial-direction displacement dc (not illustrated) corresponding to d1 and d3 toward the shaft tilt pivot axis 53 (swing center of first universal joint 52) from the shaft engagement portion 40a (flange portion 46Ba) (see FIG. 7) during the tilting operation from reference position N. A space between the annular collar portion 58 and the flange portion 46Ba is contracted by the axial-direction displacement dc from the situation at reference position N.

At reference position N, therefore, the wave washer 48B is mounted in a state allowing compressive deformation by at least an amount corresponding to the axial-direction displacement dc. The flexing of the wave washer allows the steering shaft 51 to move the predetermined distance dc in the axial direction. Therefore, although the space between the annular collar portion 58 and the flange portion 46Ba is contracted during the shifting operation, the steering shaft 51 remains axially aligned in the tube member 42 of steering column 40, and an excessive thrust loading from abutment between the annular collar portion 58 and the flange portion 46Ba is prevented.

In the situation of FIGS. 5B and 6B, the shaft engagement portion 40a (flange portion 46Ba) shifts an axial-direction displacement dd (not illustrated) corresponding to d2 and d4 toward the shaft tilt pivot axis 53 (swing center of the first universal joint 52) from the column engagement portion 51a (annular collar portion 58) during tilt operation from reference position N (see FIG. 7). The space between the annular collar portion 58 and the flange portion 46Ba is expanded by the axial-direction displacement dd from the situation at reference position N.

At the reference position N, therefore, the wave washer 48B is mounted in a compressed state allowing for expansion by an amount at least corresponding to the axial-direction displacement dd. The flexing of the wave washer allows the steering shaft 51 to move the predetermined distance dd in the axial direction. Therefore, although the space between the annular collar portion 58 and the flange portion 46Ba increases during the shifting operation, the steering shaft 51 remains axially aligned in the tube member 42 of steering column 40 such that rattling is prevented.

The tilt steering apparatus 4 is provided with the steering shaft 51 and steering handle 50. The steering column 40 has the cylindrical tube member 42 housing steering shaft 51 and is pivotally installed on the body frame 2 for tilt around the tilt center shafts 41. The intermediate shaft 54, which is provided between the steering gearbox 60 and the steering shaft 51, is connected at one end to the first universal joint 52 opposite steering shaft 51 and at the other end to the second universal joint 55 whose movement with regard to the body frame 2 is limited.

Furthermore, the steering shaft 51 has end sides held by the front-side and rear-side bearing members 46A, 46B for relative rotation within tube member 42 of steering column 40. The steering shaft 51, by engaging with the flexing wave washers 48A, 48B provided on the axial-direction outer ends of the front-side and rear-side bearing members 46A, 46B of the steering column 40, is allowed to move the axial-direction displacement for aligned support within the tube member of steering column.

As a result, the axial-direction displacement of steering shaft 51 relative to steering column 40 during a tilting operation is absorbed by the wave washers 48A, 48B on the axial-direction outer ends of the front-side and rear-side bearing members 46A, 46B. The steering shaft 51 remains axially aligned within the steering column and excessive compressive force and rattling due to abutment between the steering shaft 51 and the steering column 40 is avoided. Therefore, steering force influences that accompany tilting can be reduced, and steerability can be improved for large tilt angle changes.

The wave washers 48A, 48B have resilient properties (i.e., a springrate and a displacement range) that are selected such that the wave washers are able to flex relative to the weights of the steering shaft 51 and the steering handle 50, can absorb the axial-direction displacement of the steering shaft 51 that accompanies the tilting operation, and are mounted in the state allowing further compressive deformation.

The steering shaft 51 can be aligned in the axial direction in a state where the steering handle 50 is assembled with substantially no deformation of the wave washers 48A, 48B due to the weights of the steering shaft 51 and the steering handle 50. Assembly and maintenance of the first and second universal joints 52, 54 are improved.

Figure 9:
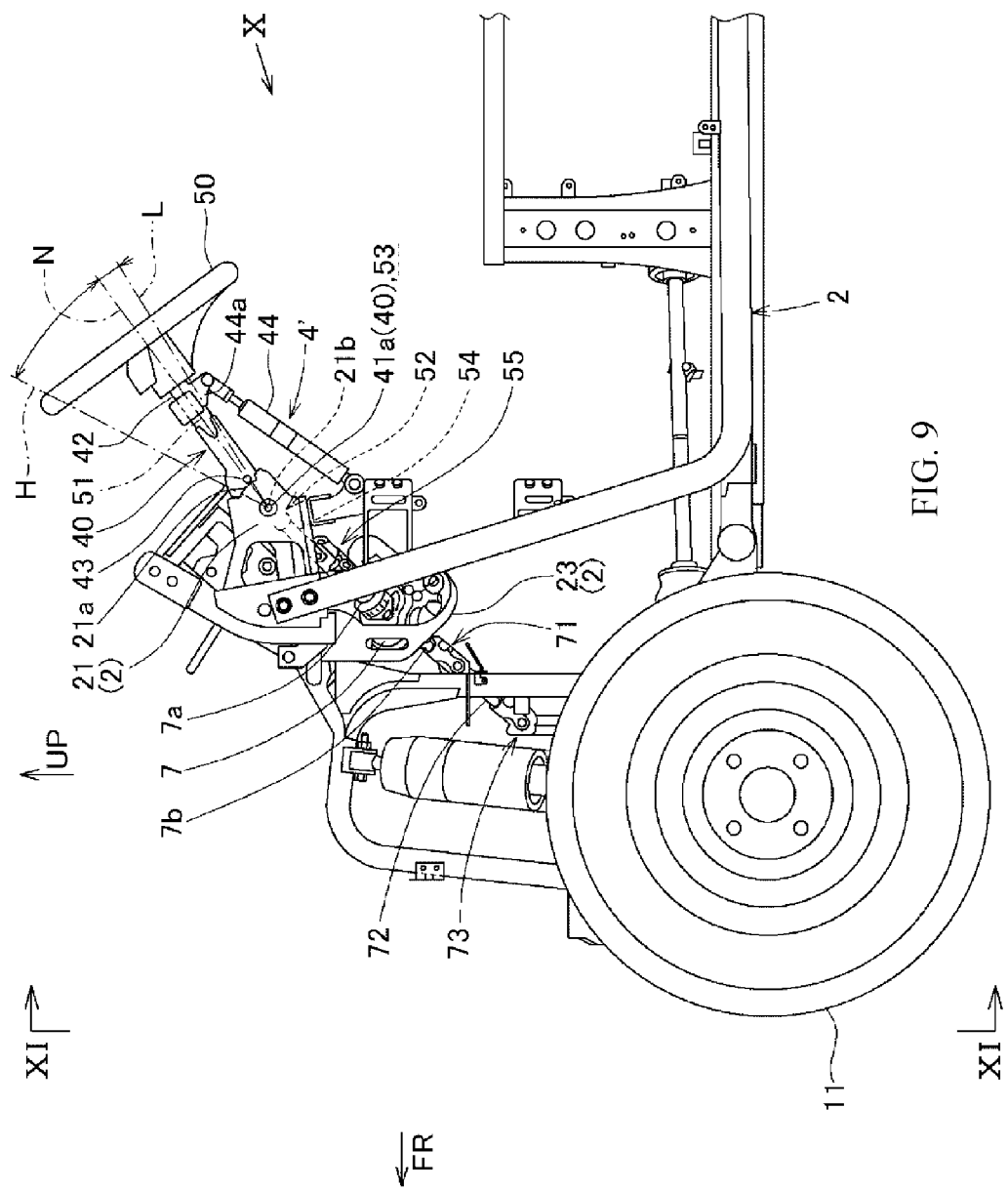
FIG. 9 is a left-side view showing the tilt steering apparatus and the body frame and a vicinity thereof according to embodiment 2 in FIG. 1.
Figure 10:
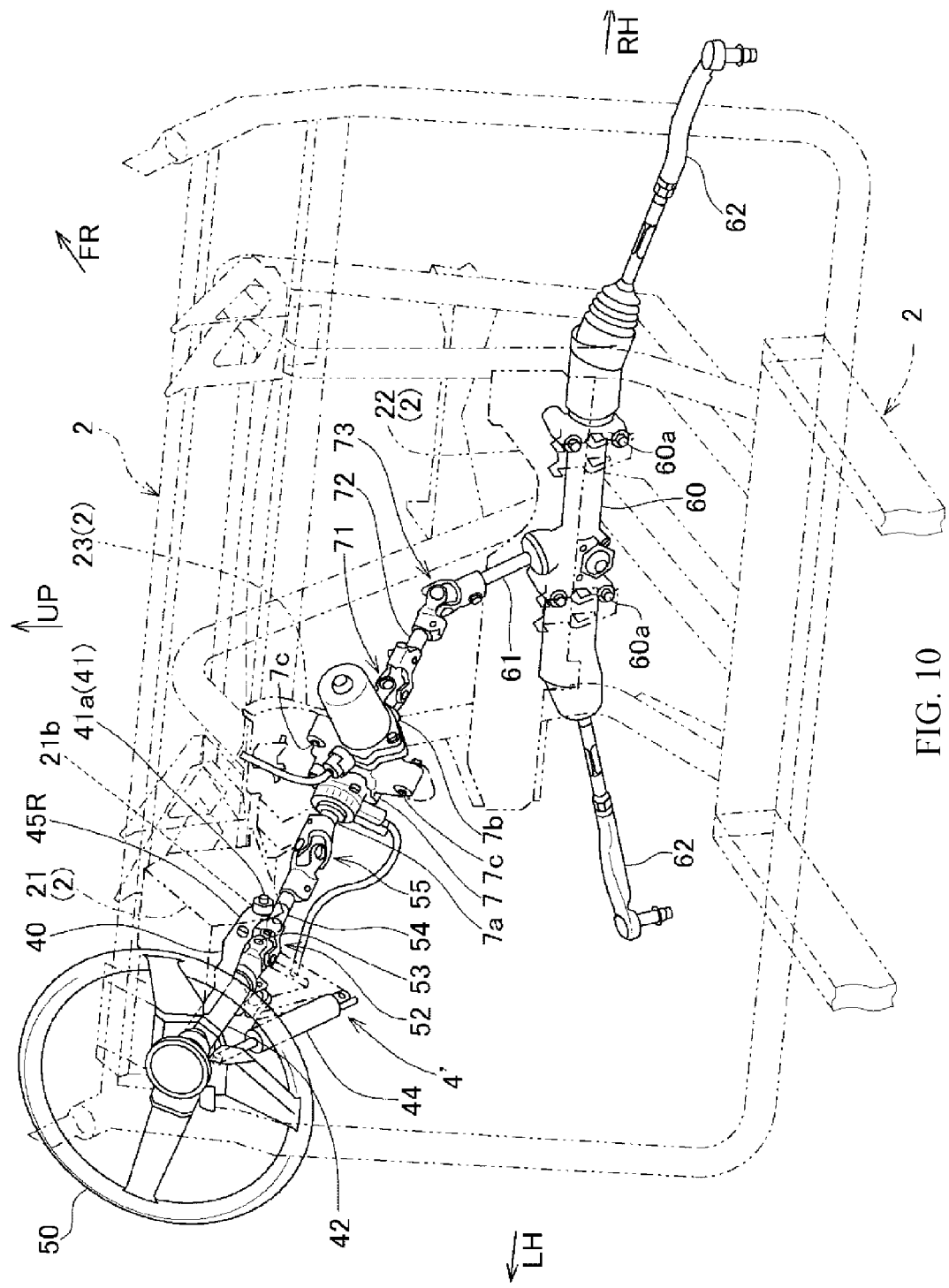
FIG. 10 is a perspective view from a rear-right point of view corresponding to arrow X view in FIG. 9 of the tilt steering apparatus and the body frame and the vicinity thereof.
Figure 11:
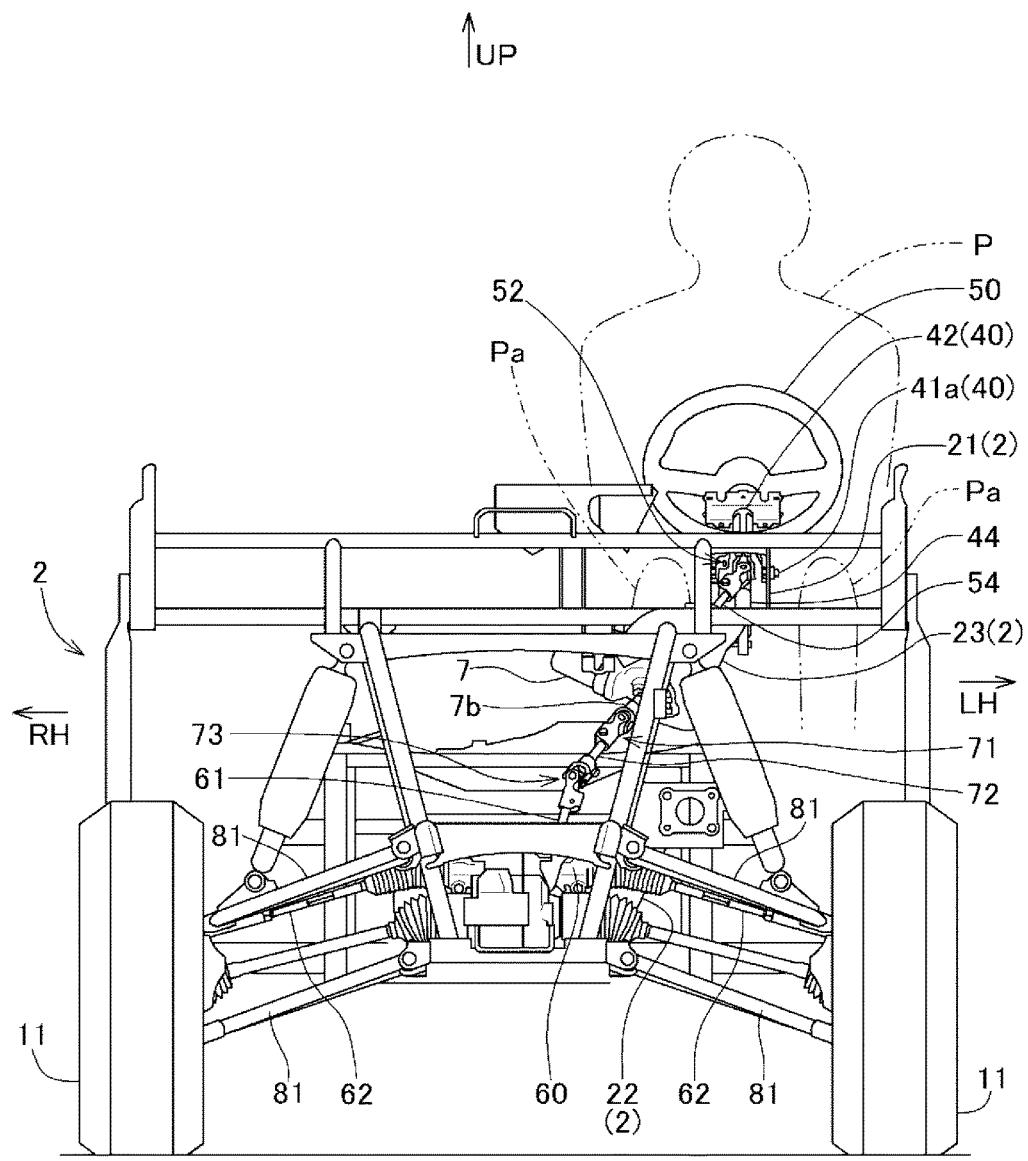
FIG. 11 is a front view taken along lines XI-XI in FIG. 9 showing the tilt steering apparatus and the body frame and the vicinity thereof.

Referring to FIGS. 9 to 11, a tilt steering apparatus 4' according to embodiment 2 is described below.

Embodiment 2 differs from the above-described embodiment 1 only in that a steering torque assist mechanism 7 is provided between the steering gearbox 60 and the second universal joint 55 and is otherwise fundamentally similar to embodiment 1.

FIG. 1 illustrating the left-side schematic view of the vehicle 1, FIGS. 4 to 6B relating to the axial-direction displacement of the steering shaft 51 relative to the steering column 40, and FIGS. 7, 8A and 8B relating to the structures of the steering shaft 51 and the steering column 40, and the like are similarly referenced.

Therefore, the configurations, actions, and effects of functions similar to those of embodiment 1 in the following description of embodiment 2 will use the same reference signs even if description is omitted and there are differences in terms of illustration. The scope of patent claims should be understood to include both embodiments.

A configuration summary of the tilt steering apparatus 4' of embodiment 2 is described based on FIGS. 9 to 11.

The steering column 40 is installed to the column installation bracket 21 in the upper-front portion of body frame 2 so the rear portion of the steering column 40 can be tilted up and down by the tilt center shafts 41.

The steering column 40 has cylindrical tube member 42 extending in the front-rear direction, and the steering shaft 51 (having central axis illustrated in broken line in FIG. 9; see also FIG. 7) is inserted within tube member 42 for rotatable support.

The steering handle 50 is installed on the rear end of steering shaft 51. The first universal joint 52 is secured to the front end of steering shaft 51. The components are arranged such that the swing center 53 of first universal joint 52 and the central axes 41*a* of the tilt center shafts 41 of steering column 40 are aligned (see FIG. 7).

The intermediate shaft 54 is installed at opposite ends to the first and second universal joints 52, 55.

A steering torque assist mechanism installation bracket 23 is provided in a front middle-stage portion of the body frame 2. The steering torque assist mechanism 7 is secured to the steering torque assist mechanism installation bracket 23 with a fastening bolt 7*c*. The second universal joint 55 is installed to an input shaft 7*a* protruding diagonally upward and rearward.

A third universal joint 71 is installed to an output shaft 7*b* that protrudes diagonally downward and forward from the steering torque assist mechanism 7. A second intermediate shaft 72 is installed at one end to a third universal joint 71 and at an opposite end to a fourth universal joint 73.

The gearbox installation bracket 22 is provided in the lower-front portion of body frame 2, and the steering gearbox 60 is secured to the gearbox installation bracket 22 with a fastening bolt 60*a*.

The steering gearbox 60 is of the rack-and-pinion type in which steering is performed as follows. Rotation for steering is transmitted to the input shaft 61 protruding upward at the substantial center of the steering gearbox 60. The rotation is converted into the left-and-right movement of the tie rods 62, 62 extending to the left and right of the steering gearbox 60. The movement of tie rods 62, which are secured to knuckle arms (not illustrated) for front-wheels 11, 11, results in swinging of the knuckle arms. The steering gearbox 60 may be of another type, such as the ball-and-nut type. Either type of steering gearbox is conventional and known, and a detailed description thereof is omitted.

The fourth universal joint 73 is installed to the input shaft 61 of steering gearbox 60.

The rotational movement of the steering handle 50 is transmitted to the steering torque assist mechanism 7 via steering shaft 51, first universal joint 52, intermediate shaft 54, second universal joint 55, and input shaft 7*a*. A rotational movement of the output shaft 7*b* of steering torque assist mechanism 7 is then transmitted to the steering gearbox 60 via third universal joint 71, second intermediate shaft 72, fourth universal joint 73, and input shaft 61. The rotation is converted into left-and-right movement of tie rods 62, 62 for steering of the front wheels 11, 11 via knuckle arms.

As illustrated in FIG. 9, steering column 40 is supported on the column installation bracket 21 for tilt up and down at the tilt center shafts 41 from the reference position N to the upper-limit position H or the lower-limit position L in the state where the steering shaft 51 is rotatably supported by the steering column 40.

The upper-limit and lower-limit positions H, L for steering column 40 are established by the stopper 43 contacting upper and lower ends of the notched concave portion 21*a* on the column-installation-bracket 21.

The free-lock type gas damper ("damper mechanism") 44 for arbitrarily locking the tilt position is provided between the column installation bracket 21 and the tube member 42 of steering column 40. With the free-lock type gas damper 44, the upper end is installed to a damper-fastening bracket 44*a* provided on a lower portion of the tube member 43, and the lower end is installed to the column installation bracket 21. The steering column 40 can be locked at any position between the upper-limit position H and the lower-limit position L.

Because the free-lock type gas damper 44 is installed to the lower portion of the tube member 43 in FIG. 11, the free-lock type gas damper 44 avoids protruding on the left and right sides of tube member 42 of steering column 40. This arrangement ensures space for the knee Pa of the passenger P during the tilting operation.

The first universal joint 52 is secured to the front end of the steering shaft 51, which is inserted through the tube member 42 of steering column 40 for rotatable support. The intermediate shaft 54 is installed to the other side of the first universal joint 52.

The front-end side of the intermediate shaft 54 is installed to the second universal joint. However, because the second universal joint 55 is installed to the input shaft 7*a* of the steering torque assist mechanism 7, which is secured to the steering torque assist mechanism installation bracket 23, movement of the second universal joint in the axial direction relative to the body frame 2 is limited.

Therefore, the swing center 53 of first universal joint 52 installed on the rear-end side of intermediate shaft 54 is also the shaft tilt pivot axis 53 in the tilting operation of the steering shaft 51. Because the steering shaft 51 is secured to the first universal joint 52, the movement of the steering shaft 51 relative to the body frame 2 in the axial direction is limited.

The tilt center shafts 41 of steering column 40 are installed in the tilt center holes 21*b* provided in the column installation bracket 21 of body frame 2. The position of the tilt center shafts 41 relative to the body frame 2 is established. The central axes 41*a* of the tilt center shafts, therefore, also defines the column tilt pivot axis 41*a* in the tilting operation of the steering column 40.

Figure 8:
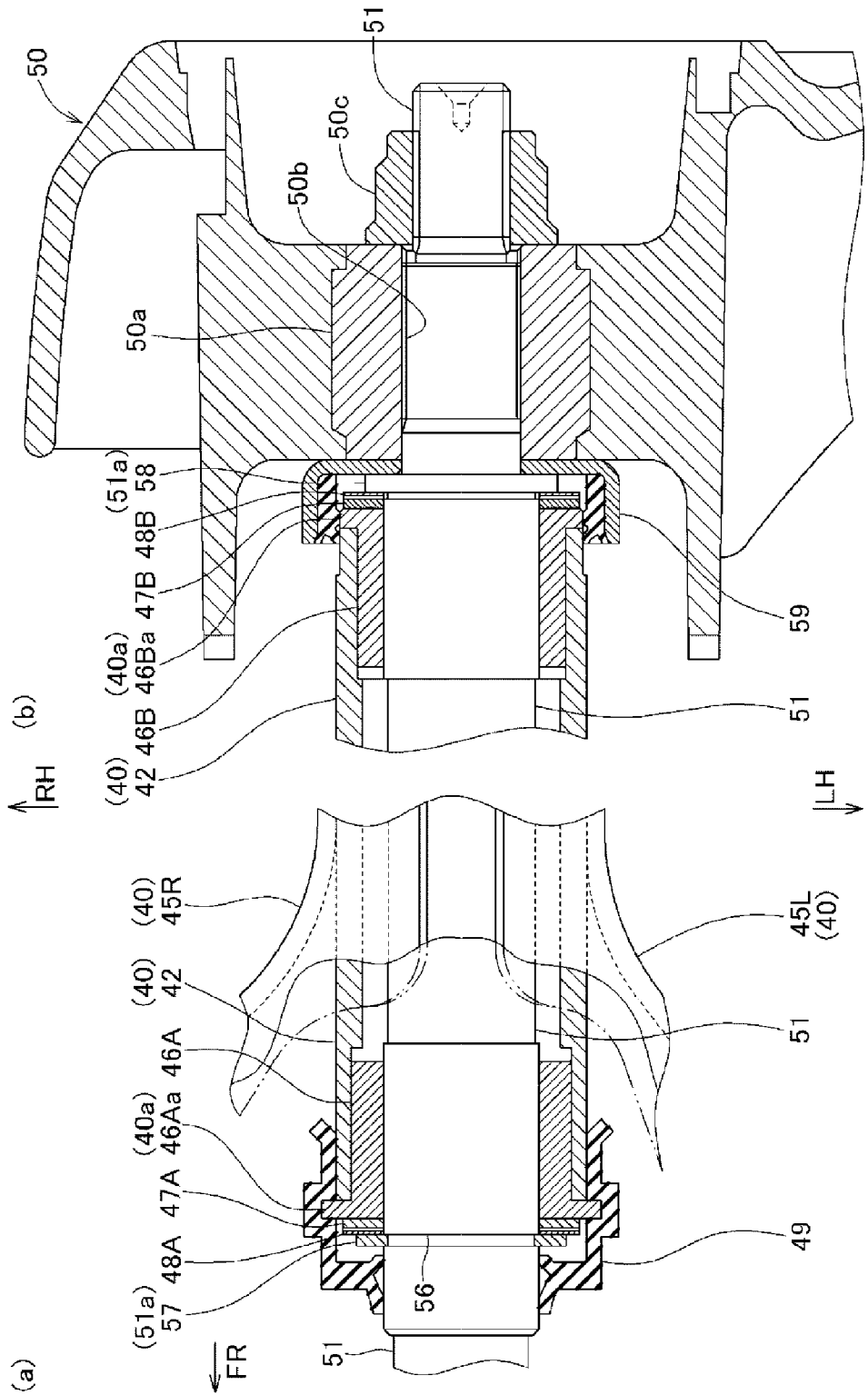
FIGS. 8A and 8B are enlarged cross-sectional views of portions A and B, respectively, in FIG. 7.

In a similar fashion as embodiment 1, however, it is difficult to avoid a minute shift in assembly resulting in an offset c between the swing center 53 of first universal joint 52 assembled to the steering torque assist mechanism installation bracket 23 and the central axes 41*a* of tilt center shafts 41 installed in the tilt center holes 21*b* in the column installation bracket 21. However, similar to embodiment 1, the structures for the steering shaft 51 and steering column 40 illustrated in FIGS. 7 and 8 are provided, and similar actions and effects are exhibited.

A front-end side of the intermediate shaft 54 is connected via the second universal joint 55 to the steering torque assist mechanism 7, which is supported by the steering torque assist mechanism installation bracket 23 of body frame 2. The steering torque assist mechanism 7 becomes provided independently of the steering column 40 such that a steering column 40 vicinity can be prevented from increasing in size, ensuring space for a driver in the tilting operation and enabling an enlargement of the tilt angle.

Referring to FIG. 11, because the steering torque assist mechanism 7 is separated from the steering gearbox 60 and independently supported by the steering torque assist mechanism installation bracket 23 of body frame 2, the steering gearbox 60 vicinity can be prevented from increasing in size. As a result, a suspension rod 81 that supports the front wheels 11, 11 can be lengthened, thereby improving ride comfort by increasing a cushion stroke.

Referring to FIG. 10, because a distance between the steering torque assist mechanism 7 and the steering column 40 is shortened, tilting conditions of the first and second universal joints 52, 55 become strict (see FIG. 10). However, because the wave washers 48A, 48B absorb axial-direction displacements (da to dd described above) for steering shaft 51, influences on steering force are reduced, and the steering force can be improved even in large tilt angle changes.

The tilt steering apparatus of embodiments 1 and 2 are described above. However, the present invention is not limited to the above embodiments, and the scope and spirit of the present invention includes implementations of various aspects.

For example, the vehicle of the present invention is not limited to a four-wheel-drive off-road vehicle shown in the figures and may be incorporated into various vehicles provided with tilt steering.

The power unit is not limited to in-line two-cylinder water-cooled four-stroke internal combustion engines and may be various power units.

The elastic members may be another type of spring such as a disk spring or a coil spring. However, the illustrated wave washers are effective as they are incorporated coaxially with the shaft and facilitate obtaining a suitable elastic force and stroke.

What is claimed is:

1. A tilt steering apparatus comprising:
a steering shaft to which a steering handle is installed;
a steering column having a cylindrical tube member housing the steering shaft, the steering column rotatably installed on a body frame for tilt around a tilt center shaft; and
an intermediate shaft provided between a steering gearbox and the steering shaft, the intermediate shaft being installed to a first universal joint fixed to the steering shaft on one end side of the intermediate shaft and on another end side to a second universal joint whose movement in an axial direction relative to the body frame is limited, wherein
the steering shaft has opposite ends each rotatably supported by a bearing member for rotation of the steering shaft relative to the tube member of the steering column, the steering shaft engaging with elastic members provided on axial-direction outer ends of both bearing members, the elastic members flexing to provide for movement of the steering shaft within the steering column in an axially-aligned manner, the elastic members having elastic properties allowing the elastic members to contract a predetermined amount relative to a weight of the steering shaft and a weight of the steering handle and to absorb an axial-direction displacement of the steering shaft that accompanies a tilting operation, and wherein the steering shaft is alignable in a state where there is substantially no deformation of the elastic members due to the weight of the steering shaft and the weight of the steering handle to facilitate assembly and maintenance of the steering apparatus, and wherein the tube member of the steering column includes opposite ends and each of the elastic members is located outside the tube member at an axial distance from the associated end of the tube.

2. The tilt steering apparatus according to claim 1, wherein the intermediate shaft is connected via the second universal joint to a steering torque assist mechanism that assists a steering force, the steering torque assist mechanism supported on the body frame.

3. The tilt steering apparatus according to claim 2, wherein the steering torque assist mechanism is separated from the steering gearbox and independently supported on the body frame.

4. The tilt steering apparatus according to claim 1, wherein the steering column includes left and right arm portions connected to the tube member, each arm portion rotatably secured to a column installation bracket supported on the body frame, the steering shaft and the intermediate shaft connected to the first universal joint between the arm portions.

5. The tilt steering apparatus according to claim 1, wherein a damper mechanism that locks a tilt position of the tube member of the steering column is installed to a lower portion of the tube member.

6. The steering apparatus of claim 1, wherein each end of the tube member of the steering column defines an end face, and wherein each bearing member includes a cylinder portion and a flange portion, the cylinder portion received within the tube member such that the flange portion abuts the associated end face of the tube member.

7. A tilt steering apparatus comprising:
a steering column having a cylindrical steering column tube defining first and second end portions, the steering column rotatably supported for rotation of the steering column about a steering column tilt axis during a tilt operation;
a steering shaft at least partially housed within the steering column tube;
a universal joint having a swing center, the universal joint secured to an end of the steering shaft such that the swing center defines a steering shaft tilt axis for the steering shaft;
first and second bearing members respectively engaging the first and second end portions of the steering column tube, the bearing members rotatably supporting the steering shaft within the steering column tube for rotation of the steering shaft about a central axis of the steering shaft; and
first and second elastic members operably engaged between the steering shaft and the first and second end portions of the steering column tube, respectively, to provide relative axial movement between the steering shaft and the steering column tube during the tilt operation so as to accommodate an offset between the steering shaft tilt axis and the steering column tilt axis, wherein each bearing member includes a cylindrical portion and a flange portion, the cylindrical portion received within the associated end portion of the steering column tube such that the flange portion abuts an end face defined by the steering column tube.

8. The tilt steering apparatus of claim 7 further comprising a C-ring received in an annular groove defined by the steering shaft such that the first elastic member is disposed between the C-ring and the flange portion of the first bearing member in contact with the C-ring.

9. The tilt steering apparatus of claim 8 further comprising a thrust washer contacting the flange portion of the first bearing member, the first elastic member disposed between the C-ring and the thrust washer, the first elastic member including a wave washer.

10. The tilt steering apparatus of claim 7 further comprising a collar extending radially from the steering shaft, the second elastic member contacting the collar.

11. The tilt steering apparatus of claim 10 further comprising a thrust washer contacting the flange portion of the second bearing member, the second elastic member disposed between the collar and the thrust washer, the second elastic member including a wave washer.

12. The tilt steering apparatus of claim 7, wherein the steering column includes left and right arm portions connected to the steering column tube, each arm portion secured to a support member by a bushing and a fastener for rotatably supporting the steering column, the fastener having a shaft portion received by the bushing, the steering column tilt axis defined by central axes of fastener shaft portions.

13. The tilt steering apparatus of claim 12, wherein at least one of the arm members includes a stopper projecting from the arm member, the stopper contacting a notched portion of the support member to define upper and lower limit positions of the steering column.

14. The tilt steering apparatus of claim 7, wherein the universal joint is a first universal joint and wherein the first universal joint is connected to a steering gear assembly via at least one intermediate shaft and at least one additional universal joint.

15. The tilt steering apparatus of claim 14 further comprising a steering torque assist mechanism operably connected between the first universal joint and the steering gear assembly.

16. The tilt steering apparatus of claim 7 further comprising a damper mechanism having an end connected to the steering column.

17. The tilt steering apparatus of claim 16, wherein the damper mechanism is connected to a side portion of the steering column.

18. A tilt steering apparatus comprising:
a steering wheel;
a steering shaft connected to the steering wheel;
a steering gear assembly supported on a body frame;
a linkage assembly connecting the steering shaft to the steering gear assembly, the linkage assembly including a first universal joint secured to an end of the steering shaft, an intermediate shaft having a first end connected to the first universal joint, and a second universal joint secured to a second end of the intermediate shaft, the first universal joint including a swing center defining a steering shaft tilt axis;
a steering column including a cylindrical steering column tube having opposite first and second ends, the steering column pivotably connected to a support member fixed to the body frame for rotation of the steering column about a steering column tilt axis during a tilt operation;
first and second bearings engaging the opposite ends of the steering column tube for rotatable support of the steering shaft with respect to the steering column; and
first and second elastic members each located outside the steering column tube at an axial distance from the associated end of the steering column tube and operably engaged between the steering shaft and the steering column tube, the elastic members flexing to provide axial movement of the steering shaft with respect to the steering column tube, the axial movement of the steering shaft accommodating an offset between the steering shaft tilt axis and the steering column tilt axis.

19. The tilt steering apparatus of claim 18 further comprising first and second thrust washers respectively contacting the end faces of the first and second bearings, a C-clip received in an annular notch of the steering shaft, and a collar extending radially from the steering shaft, the first elastic member including a wave washer disposed between the C-clip and the first thrust washer, the second elastic member including a wave washer disposed between the collar and the second thrust washer.

* * * * *